United States Patent [19]

Fujimoto

[11] Patent Number: 4,593,531
[45] Date of Patent: Jun. 10, 1986

[54] ABSORPTION COOLING AND HEATING APPARATUS AND METHOD

[75] Inventor: Masakazu Fujimoto, Tokyo, Japan

[73] Assignee: Ebara Corporation, Japan

[21] Appl. No.: 691,540

[22] Filed: Jan. 15, 1985

[51] Int. Cl.[4] ............................................. F25B 15/00
[52] U.S. Cl. ................................. 62/101; 62/324.2; 62/476; 237/2 B
[58] Field of Search ...................... 62/324.2, 476, 148, 62/101; 237/2 B

[56] References Cited

U.S. PATENT DOCUMENTS

| | | | |
|---|---|---|---|
| 3,304,742 | 2/1967 | Eisberg | 62/476 |
| 4,394,959 | 7/1983 | de Vries | 62/324.2 X |
| 4,464,907 | 8/1984 | Mack et al. | 62/476 X |

Primary Examiner—Lloyd L. King
Attorney, Agent, or Firm—Steinberg & Raskin

[57] ABSTRACT

An absorption cooling and heating apparatus and method, in which generator means evaporates a refrigerant from a solution therewithin to form refrigerant vapor, and condenser means then condenses the refrigerant vapor so produced within the generator means. Evaporator means receives the condensed refrigerant from the condenser means, and evaporates the same to form vapor therewithin, with absorber means being provided to absorb the refrigerant vapor that was formed in the evaporator means. The absorber means also receives a concentrated solution conveyed from the generator means, and delivers a dilute solution to the generator means. Heat exchanger means is provided for effecting heat exchange between the concentrated solution being passed to the absorber means, and the dilute solution being returned back to the generator means. Also, switch means for alternately changing to a cooling or to a heating cycle is provided. The condensed refrigerant passed from the condenser means is mixed with the dilute solution being passed back into the generator means, by compulsory mixing means such as an ejector or a refrigerant pump, with the aid of the switching means. The generator means may also comprise a separate high temperature generator and a low temperature generator, with refrigerant vapor being condensed through a condensation conduit passing through the low temperature generator to thereby heat the solution therewithin, and then being mixed with the dilute solution being supplied to the low temperature generator itself, by virtue of the inner pressure generated within the high temperature generator.

22 Claims, 4 Drawing Figures (A)

Concentration (B)

Concentration

ABSORPTION COOLING AND HEATING APPARATUS AND METHOD

BACKGROUND OF THE INVENTION

The present invention relates to an absorption cooling and heating apparatus and method, operating according to an absorption refrigeration cycle by utilizing a refrigerant and an absorber liquid, in which a cooling cycle or a heating cycle can be alternately selected and effected.

In conventional apparatus and methods of this kind, such as disclosed in Japanese Patent Publications Nos. 52(1977)-6894 and 52(1977)-6895, a refrigerant is mixed into a concentrated solution system. However, certain deficiencies exist in the conventional apparatus and methods of this kind, such as disclosed in the above-noted Japanese Patent Publications.

First of all, in order to obtain a hot liquid such as water of relatively high temperature, it is necessary to raise the condensation temperature by raising the vapor pressure in a generator. Therefore, it has been necessary to dilute the concentration of the solution within the generator. However, the concentration of the solution within the generator cannot be diluted that much, so that the temperature of the hot liquid such as water cannot be raised very high by this procedure.

Therefore, in order to raise the temperature of the hot water even higher, it has been necessary to lower the concentration of the solution released from an absorber, i.e. the standard concentration of the solution. A complicated control mechanism which changes the level of the refrigerant in an evaporator when cooling or heating, and which transfers much refrigerant to the absorber side thereof when heating, is required.

Moreover, when refrigerant is mixed with the concentrated solution, striking unevenness of admixture results. This easily causes corrosion within the apparatus, and also generates noise when the refrigerant, especially in relatively large amounts, is absorbed into the concentrated solution itself.

SUMMARY OF THE INVENTION

Accordingly, it is an object of the present invention to provide an absorption cooling and heating apparatus and method, which eliminate the above-noted disadvantages of conventional apparatus and methods.

It is also an object of the present invention to reduce or totally eliminate the possibility of corrosion occurring in absorption cooling and heating apparatus and methods.

It is another object of the present invention to reduce or totally eliminate generation of noise in absorption cooling and heating apparatus and methods.

It is a further object of the present invention to reduce or totally eliminate unevenness of mixing of fluids in absorption cooling and heating apparatus and methods.

It is still another object of the present invention to heat the operational fluid within an absorption cooling and heating apparatus and method, to the optimally-desired temperature.

These and other objects are attained by the present invention which provides an absorption cooling and heating apparatus comprising generator means which evaporates a refrigerant from a solution therewithin to form refrigerant vapor, condenser means which condenses the refrigerant vapor evaporated by the generator means, evaporator means which receives the condensed refrigerant conveyed from the condenser means and evaporates the same to form refrigerant vapor therewithin, and absorber means which absorbs the refrigerant vapor that was formed by evaporation within the evaporator means. The absorber means also receives a concentrated solution conveyed from the generator means, and forms a dilute solution by absorption of the refrigerant vapor therewithin, which, in turn, is conveyed to the generator means. Additionally, heat exchanger means is provided for effecting heat exchange between the concentrated solution conveyed from the generator means to the absorber means, and the dilute solution conveyed out from the absorber means and back to the generator means. Switching means for alternately changing to a cooling or to a heating operation or cycle, is also provided.

An improvement in the absorption cooling and heating apparatus that is provided by the present invention, is means for mixing at least a portion of the condensed refrigerant with the dilute solution passed through the heat exchanger means, with the aid of the switching means. The refrigerant may be intially evaporated within the generator means with the aid of an external heating source.

Alternatively, in a particular embodiment of the present invention, second, higher temperature generator means may be provided, whereby refrigerant vapor formed within this second high temperature generator means is conveyed through the first generator means, e.g. through at least one conduit disposed therethrough, whereby this refrigerant vapor condensing along the conduit transfers heat into the first generator means, thereby heating and evaporating the refrigerant therewithin to form the refrigerant vapor. The condensed refrigerant within this conduit is then mixed via mixing means with the dilute solution being introduced into the generator means.

The present invention is also directed to a method for alternately effecting heating and cooling, which comprises evaporating refrigerant within generator means to form vapor, condensing the refrigerant vapor, and then evaporating the thus-condensed refrigerant to release energy for cooling, during a cooling cycle. The thus-evaporated refrigerant is then absorbed into a concentrated solution that is received from the generator means, to form a dilute solution which, in turn, is conveyed back to the generator means, after engaging in heat exchange with the concentrated solution being conveyed out from the generator means itself. The cooling cycle may be then switched to a heating cycle, by admixing at least a portion of the condensed refrigerant with the thus-formed dilute solution, prior to introduction of the same into the generator means.

In a particular embodiment of the method of the present invention, at least a portion of the thus-formed dilute solution is passed to a second, high temperature generator means, where refrigerant evaporated within this second high temperature generator means is passed through the first generator means, e.g. along a condensation conduit disposed therethrough, so that condensing refrigerant vapor transfers heat to the solution within the generator means, to evaporate refrigerant vapor therefrom. The refrigerant condensed within the condensation conduit passing through the first generator means, may then be mixed with the dilute solution being introduced into the first generator means, during a heating cycle.

BRIEF DESCRIPTION OF THE DRAWINGS

Other objects, features, and advantages of the present invention will become more fully apparent from the following detailed description thereof, in conjunction with the accompanying drawings, in which.

DETAILED DESCRIPTION OF THE PREFERRED EMBODIMENTS

Figure 1:
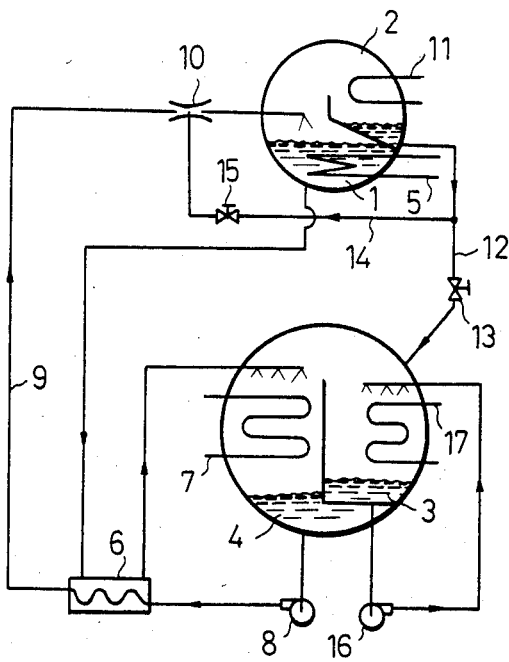
FIG. 1 is a schematic view illustrating one embodiment of a single effect absorption cooling and heating apparatus and method according to the present invention.

Referring to the drawings, in which similar reference numerals denote similar components throughout the several views, FIG. 1 illustrates one embodiment of a single effect absorption cooling and heating apparatus and method according to the present invention.

In FIG. 1, a generator 1 and a condenser 2 are combined within a single cylindrical shell or container, and an evaporator 3 and an absorber 4 are combined within a single cylinder shell or container too. A solution is heated within the generator 1 by a heating source 5, to evaporate a refrigerant therefrom, thereby obtaining a concentrated, hot solution therewithin. This concentrated, hot solution is then passed from the generator 1 to the absorber 4 through a heat exchanger 6 as illustrated.

The concentrated, hot solution from the generator 1 is sprayed into the absorber 4 as illustrated in FIG. 1. This concentrated hot solution absorbs refrigerant vapor while being sprayed, such refrigerant vapor having been vaporized within the evaporator 3. At the same time, the resulting solution is cooled by cooling water flowing through a conduit 7 to result in a cooled dilute solution within the absorber 4. This cooled, dilute solution is then passed from the absorber 4 through the heat exchanger 6 by a liquid pump 8. The dilute solution is heated through the heat exchanger 6, by the concentrated solution that is being passed from the generator 1 to the absorber 4. After heating, the dilute solution is then passed back into the generator 1, through an inlet conduit 9 and an ejector 10.

Vaporized refrigerant from the generator 1 is condensed within the condenser 2 by a line 11 for cooling water. The condensed refrigerant is then passed to the evaporator 3 through a return conduit 12 and through a valve 13 disposed therewithin, for cooling (i.e. during a cooling cycle). The condensed refrigerant may also be passed to the ejector 10 through a refrigerant by-pass conduit 14 and through a valve 15, for heating (i.e. during a heating cycle). The condensed refrigerant is compulsorily mixed within the ejector 10, with the dilute, hot solution being passed back into the generator 1. The ejector 10 is provided for ensuring mixing of the refrigerant with the dilute solution. Instead of the ejector 10, a forced refrigerant pump may be utilized in the middle of the refrigerant bypass conduit 14, according to the present invention.

The condensed refrigerant within the evaporator 3 is recirculated by a refrigerant pump 16. The recirculated, condensed refrigerant, while being sprayed down into the evaporator 3 as illustrated in FIG. 1, is readily evaporated under low pressure by liquid flowing through a line 17 to be cooled, such as cool water, by virtue of the latent heat of vaporization thereof. This conduit 17 for the liquid to be cooled, such as water, is in turn generally connected to a burden or load to be cooled.

In the embodiment illustrated in FIG. 1, the valve 13 is opened and the valve 15 is closed during the cooling operation or cycle. On the other hand, the valve 13 is closed and the valve 15 is opened during the heating cycle or operation. During the heating operation, the condensed refrigerant collected within the condenser 2 is fed to the ejector 10 through the bypass conduit 14. The condensed refrigerant is mixed with the dilute solution in the ejector 10. In other words, the dilute solution is further diluted by introduction of the condensed refrigerant therewithin, in the ejector 10. This further diluted solution is then fed to the generator 1 as illustrated in FIG. 1. In the heating cycle or operation, a burden or load to be heated is connected to the conduit 11 for the cooling water, which is in turn heated by virtue of the heat of condensation of the refrigerant therewithin.

Figure 2:
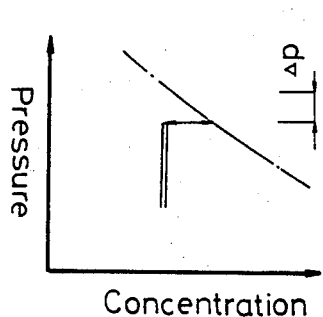
FIG. 2 is a graphical representation illustrating the relationship between the concentration of a solution and a pressure within the generator attained by the apparatus and method of FIG. 1, as compared with such relationships in a conventional apparatus.
Figure 2:
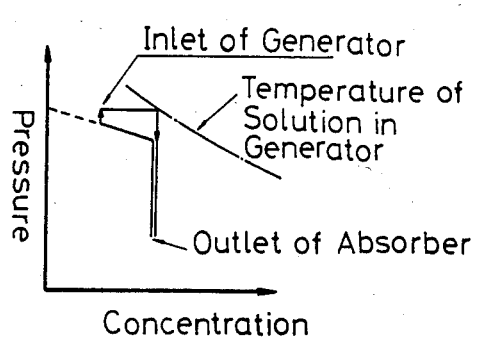

Two graphs of the relationship between the concentration of the solution and the pressure within the generator 1 are illustrated in FIG. 2. More particularly, the relationship according to a conventional apparatus and method is illustrated in FIG. 2(A), while the relationship according to the present invention is illustrated in FIG. 2(B). In these embodiments, the temperature of the solution within the generator 1 is determined monotonically by the heating source 5.

A higher pressure within the generator is obtained with a thinner or lower concentration of solution therewithin. Therefore, from the graphs in FIGS. 2(A) and 2(B), it is clear that a higher temperature of the solution within the generator 1 can be obtained in proportion to the pressure difference $\Delta p$ according to the present invention illustrated in FIG. 2(B) as compared with the conventional methods and apparatus illustrated in FIG. 2(A).

Figure 3:
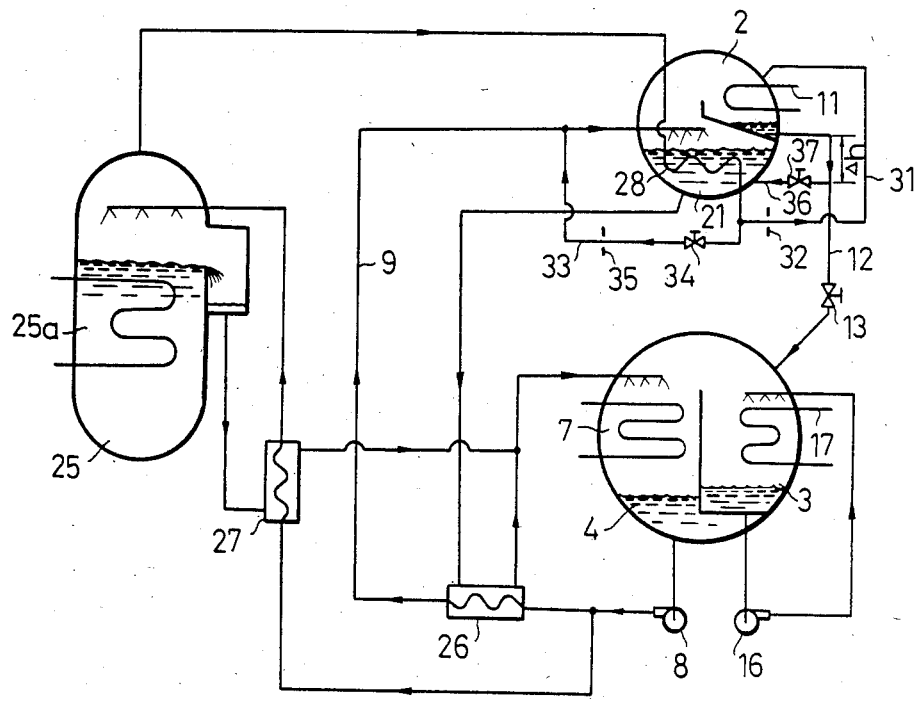
FIG. 3 is a schematic view illustrating another embodiment of a double effect absorption cooling and heating apparatus according to the present invention.

Another embodiment of the present invention is illustrated in FIG. 3, namely a double effect absorption cooling and heating apparatus and method. The apparatus of this embodiment has a similar structure to the apparatus of the first embodiment illustrated in FIG. 1. Accordingly, description of the same or similar parts in the embodiment of FIG. 3 having the same reference numerals as the components in the embodiment of FIG. 1, will be omitted for the sake of brevity.

In the embodiment illustrated in FIG. 3, a low temperature generator 21 and a condenser 2 are combined within a single, outer cylindrical shell or container. A high temperature generator 25 having a heating source 25a disposed therewithin, is separately provided as illustrated. Cooled, dilute solution conveyed out from an absorber 4 is passed to the low temperature generator 21 through the second heat exchanger 26 and conduit 9, and is also passed to the high temperature generator 25 through the first heat exchanger 27 and a corresponding conduit as illustrated, by means of a liquid pump 8.

The dilute solution introduced into the high temperature generator 25, is sprayed down thereinto as illustrated, and is heated therewithin. The resulting heated dilute solution is then circulated from the high temperature generator 25, back into the inlet conduit of the absorber 4, through the first heat exchanger 27 in which the hot dilute solution releases heat in order to heat the cooled dilute solution passing out from the absorber 4. The vapor of the refrigerant that is vaporized within the high temperature generator 25, is passed by virtue of the generated internal pressure within the high temperature generator 25, from the top thereof to a condensation refrigerant conduit 28 which is disposed to pass through a lower portion of the low temperature generator 21, thus functioning as a heating source therewithin.

The refrigerant vapor is condensed within the condensation refrigerant conduit 28 while passing through the lower portion of the low temperature generator 21, thus releasing heat to the solution within the low temperature generator 21 and thereby heating the same. The condensed refrigerant from the condensation conduit 28 is then circulated to the condenser 2 through a conduit 31 and an orifice 32, by virtue of the inner pressure generated within the high temperature generator 25.

The refrigerant condensed within the condensation refrigerant conduit 28, is also passed, in part, to the inlet conduit 9 of the low temperature generator 21, through a conduit 33, valve 34, and orifice 35, also by virtue of the inner pressure generated within the high temperature generator 25, for heating (i.e. during the heating cycle). Thus, the condensed refrigerant is compulsorily mixed with the dilute solution passing into the low temperature generator 21 along the inlet conduit 9 thereof. In other words, the dilute solution is further diluted by the condensed refrigerant being introduced into the inlet conduit 9. This additionally diluted solution is then sprayed down into the low temperature generator 21 as illustrated. The rate of admixing of the condensed refrigerant with the dilute solution within the inlet conduit 9 can be controlled by using the orifices 32 and 35, which function as restricting means for the conduits 31 and 33 respectively.

In the embodiment illustrated in FIG. 3, the refrigerant supplied to the condenser 2 releases heat to the cooling water flowing through line 11, while the refrigerant is being condensed thereby. The condensed refrigerant within the condenser 2 is partially returned to the low temperature generator 21 with a liquid head $\Delta h$, through a refrigerant bypass conduit 36 and through a valve 37, for heating (i.e. during the heating cycle).

During the cooling cycle or operation in the embodiment illustrated in FIG. 3, valves 34 and 37 are closed, while valve 13 is opened. On the other hand, valves 34 and 37 are opened and valve 13 is closed during the heating operation or cycle thereof.

Figure 4:
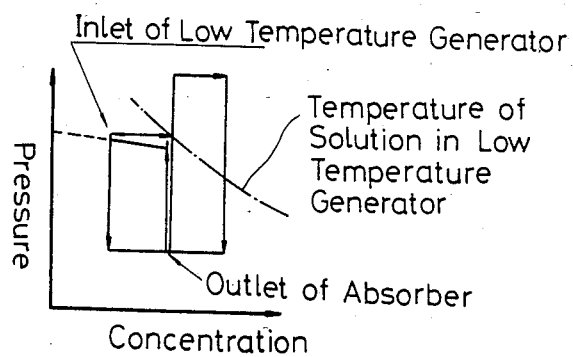
FIG. 4 is a graphical representation illustrating the relationship between the concentration of a solution and a pressure within a low temperature generator attained by the apparatus and method of FIG. 3.

FIG. 4 is a graphical illustration of the relationship between the concentration of the solution and the pressure within the low temperature generator 21. It is easily seen that a higher temperature of the solution within the low temperature generator 21 can be attained with the embodiment illustrated in FIG. 3, in the same manner as the embodiment illustrated in FIG. 1.

According to the present invention, a higher temperature of the hot liquid such as water within the absorption heating and cooling apparatus and method of the present invention, can be readily obtained as compared with the conventional apparatus and methods. Remarkable anti-corrosive and anti-noise effects are also attained with the present invention. Furthermore, in the case of a spray or sprinkler-type generator according to the present invention, which is different from a liquid-filled type of generator, the dilution effect of the solution therewithin is high, and thus the high temperature of the liquid therewithin, e.g. the hot water, can be attained. Furthermore, unevenness of admixture of refrigerant with a solution is very small according to the present invention, which is also extremely advantageous in terms of the anti-corrosion effect.

Although the present invention has been described with reference to preferred embodiments thereof illustrated in the accompanying drawings, it is clear to one of skill in the art that various modifications and changes can be made without departing from the scope of the present invention. For example, although the generator or the low temperature generator and the condenser are cooperatively combined in a single shell or container in the illustrated embodiments herein, and the evaporator and the absorber are also cooperatively combined within a single shell or container, the present invention can be directed to an embodiment in which a generator, a condenser, an evaporator, and an absorber are independently or separately provided from one another, or in which a generator, a condenser, an evaporator, and an absorber are all cooperatively combined within a single shell or container.

What is claimed is:

1. In an absorption cooling and heating apparatus, comprising
    generator means for evaporating a refrigerant liquid from a solution therewithin to form a refrigerant vapor,
    condenser means for condensing the refrigerant vapor formed by the generator means,
    evaporator means which receives the condensed refrigerant from the condenser means and evaporates the same to form refrigerant vapor therewithin,
    absorber means for absorbing the refrigerant vapor formed by the evaporator means, and which receives a concentrated solution from the generator means and passes a dilute solution to the generator means,
    heat exchanger means for effecting heat exchange between the concentrated solution and the dilute solution, and
    switching means for alternately changing to a cooling or to a heating operation,
    the improvement comprising
    means for mixing at least a portion of the condensed refrigerant condensed by the condenser means with the dilute solution passed through the heat exchanger means before the dilute solution is supplied to the generator means, in conjunction with operation of the switching means.

2. The combination of claim 1, wherein said mixing means is a compulsory mixing means.

3. The combination of claim 1, wherein said means for mixing constitutes means for mixing condensed refrigerant as the same passes out from the condenser means.

4. The combination of claim 2, wherein said compulsory mixing means is constituted by an ejector disposed within an inlet conduit for the generator means.

5. The combination of claim 2, wherein said compulsory mixing means is constituted by a refrigerant pump.

6. The combination of claim 1, additionally comprising
means at least partially disposed within the condenser means, and adapted to be heated by the condensing refrigerant vapor therewithin, and
means at least partially disposed within the evaporator means and adapted to be cooled by the refrigerant evaporated therewithin.

7. The combination of claim 1, wherein said switching means is constituted by
a branched conduit communicating with the condenser means at the inlet end thereof, and with said mixing means and the evaporator at respective outlet ends thereof, and
valve means each being disposed along the respective outlets ends communicating with said mixing means and with the evaporator means.

8. The combination of claim 1, additionally comprising
means for recycling unevaporated refrigerant from the evaporator means and back to the same.

9. In an absorption cooling and heating apparatus, comprising
generator means for evaporating a refrigerant liquid from a solution therewithin to form a refrigerant vapor,
condenser means for condensing the refrigerant vapor formed by the generator means,
evaporator means which receives the condensed refrigerant from the condenser means and evaporates the same to form refrigerant vapor therewithin,
absorber means for absorbing the refrigerant vapor formed by the evaporator means, and which receives a concentrated solution from the generator means and passes a dilute solution to the generator means,
heat exchanger means for effecting heat exchange between the concentrated solution and the dilute solution, and
switching means for alternately changing to a cooling or to a heating operation,
the improvement comprising the combination of
means for mixing at least a portion of condensed refrigerant with the dilute solution passed through the heat exchanger means, in conjunction with operation of the switching means,
second high temperature generator means for receiving a part of the dilute solution passed from the absorber means and for heating the same to generate refrigerant vapor,
conduit means communicating with said second high temperature generator means and extending through said first generator means, to constitute condensing means for refrigerant vapor flowing through the portion of said conduit means passing through the first generator means, and to constitute a heating source within the first generator means, whereby the refrigerant vapor condensing within the conduit means passing through the first generator means releases heat into the first generator means, and
means for passing at least a portion of the refrigerant condensed within said conduit means into the condenser means, and
wherein said mixing means is constituted by means for mixing the refrigerant condensed within said conduit means with the dilute solution.

10. The combination of claim 9, additionally comprising
means for transferring the dilute solution heated within the second high temperature generating means to the absorber means, and
second heat exchange means for effecting heat exchange between the portion of the dilute solution passed from the absorber means to the second generator means and the heated dilute solution passed from the second generator means to the absorber means.

11. The combustion of claim 9, wherein said mixing means is constituted by compulsory mixing means.

12. The combination of claim 11, wherein said compulsory mixing means is disposed within an inlet conduit of the first generator means, and is constituted, in part, by generated pressure from within the second high temperature generator means.

13. The combination of claim 9, additionally comprising
means for supplying a portion of the refrigerant condensed within the condenser means to the first generator means.

14. The combination of claim 1, wherein
the generator means and the condenser means are cooperatively combined with one another within a single outer container, and
the evaporator means and the absorber means are cooperatively combined with one another within a single outer container.

15. In an absorption cooling and heating apparatus, comprising
generator means for evaporating a refrigerant liquid from a solution therewithin to form a refrigerant vapor,
condenser means for condensing the refrigerant vapor formed by the generator means,
evaporator means which receives the condensed refrigerant from the condenser means and evaporates the same to form refrigerant vapor therewithin,
absorber means for absorbing the refrigerant vapor formed by the evaporator means, and which receives a concentrated solution from the generator means and passes a dilute solution to the generator means,
heat exchanger means for effecting heat exchange between the concentrated solution and the dilute solution, and
switching means for alternately changing to a cooling or to a heating operation,
the improvement comprising the combination of
means for mixing at least a portion of condensed refrigerant with the dilute solution passed through the heat exchanger means, in conjunction with operation of the switching means,
said generator means and condenser means being cooperatively combined with one another within a single outer container,
said evaporator means and absorber means being cooperatively combined with one another within a single outer container,
second high temperature generator means for receiving a part of the dilute solution passed from the absorber means and for heating the same to generate refrigerant vapor, conduit means communicating with said second high temperature generator means and extending through said first generator means, to constitute condensing means for refrigerant vapor flowing through the portion of said conduit means passing through the first generator means, and to constitute a heating source within the first generator means, whereby the refrigerant vapor condensing within the conduit means passing through the first generator means releases heat into the first generator means, and means for passing at least a portion of the refrigerant condensed within said conduit means into the condenser means, and wherein said mixing means is constituted by means for mixing the refrigerant condensed within said conduit means with the dilute solution.

16. The combination of claim 12, wherein said means for passing at least a portion of the refrigerant condensed within said conduit means to the condenser means, comprises second conduit means communicating with said first conduit means downstream of the first generator means and with the condenser means, and orifice means disposed within said second conduit means, said mixing means comprises third conduit means communicating with said first conduit means downstream of the first generator means and with said inlet conduit of the first generator means, and orifice means disposed within said third conduit means, and said switching means comprises valve means disposed within said third conduit means.

17. The combination of claim 13, wherein said means for passing a portion of the refrigerant condensed within the condenser means to the first generator means, comprises second conduit means communicating with the first generator means and with the condenser means, and the switching means comprises valve means disposed within the second conduit means.

18. A method for alternative effecting of heating and cooling, comprising the steps of evaporating refrigerant to form first refrigerant vapor from a solution within generator means, to thereby form a concentrated solution therewithin, condensing the first refrigerant vapor, evaporating the condensed refrigerant to form second refrigerant vapor and to release energy for cooling, during a cooling operation, absorbing the second refrigerant vapor into the concentrated solution received from the generator means, to form a dilute solution, transferring heat from the concentrated solution formed within the generator means, to the thus-formed dilute solution, directing the thus-formed and heated dilute solution into the generator means, and switching from the cooling operation to a heating operation, by mixing at least a portion of the thus-condensed refrigerant condensed by the condenser means, with the thus-formed dilute solution, prior to introduction of the thus-formed dilute solution into the generator means.

19. The method of claim 18, wherein the condensed refrigerant and the dilute solution are mixed by passing the same through compulsory mixing means.

20. A method for the alternative effecting of heating and cooling, comprising the steps of evaporating refrigerant to form first refrigerant vapor from a solution within generator means, to thereby form a concentrated solution therewithin, condensing the first refrigerant vapor, evaporating the condensed refrigerant to form second refrigerant vapor and to release energy for cooling, during a cooling operation, absorbing the second refrigerant vapor into the concentrated solution received form the generator means, to form a dilute solution, transferring heat from the concentrated solution formed within the generator means, to the thus-formed dilute solution, directing the thus-formed and heated dilute solution into the generator means, passing at least a portion of the thus-formed dilute solution to second, high temperature generator means, heating the dilute solution within the second high temperature generator means to form third refrigerant vapor therewithin, removing the thus-heated solution from within the second high temperature generator means and mixing the same with the concentrated solution of the first generator means, prior to absorbing the second refrigerant vapor in the same, transferring heat from the thus-removed and heated solution from within the second, high temperature generator means, to the at least a portion of the thus-formed dilute solution passed to the second, high temperature generator means, passing the third refrigerant vapor through at least one condensation tube disposed within the first generator means, whereby the third refrigerant vapor condenses to form second condensed refrigerant and heats the solution within the first generator means, thereby forming the first refrigerant vapor and the concentrated solution therewithin, and switching from the cooling operation to a heating operation, by mixing at least a portion of the second condensed refrigerant with the thus-formed dilute solution prior to introduction of the same into the first generator means.

21. The method of claim 20, wherein the second condensed refrigerant is compulsorily mixed with the thus-formed dilute solution, by pressure generated within the second, high temperature generator means.

22. The method of claim 20, additionally comprising mixing the second condensed refrigerant with the first condensed refrigerant within the condenser prior to switching to a heating cycle, and passing a portion of the thus mixed and condensed refrigerant into the first generator means, after switching to the heating cycle.

* * * * *